US008630751B2

(12) United States Patent
Bartley

(10) Patent No.: US 8,630,751 B2
(45) Date of Patent: Jan. 14, 2014

(54) TRACKING SYSTEM DEVICE AND METHOD

(75) Inventor: Bruce Howard Bartley, Taupo (NZ)

(73) Assignee: Spider Tracks Limited, Palmerston North (NZ)

( * ) Notice: Subject to any disclaimer, the term of this patent is extended or adjusted under 35 U.S.C. 154(b) by 0 days.

(21) Appl. No.: 13/381,490

(22) PCT Filed: Jun. 30, 2010

(86) PCT No.: PCT/NZ2010/000130
§ 371 (c)(1),
(2), (4) Date: Mar. 16, 2012

(87) PCT Pub. No.: WO2011/002313
PCT Pub. Date: Jan. 6, 2011

(65) Prior Publication Data
US 2012/0166016 A1 Jun. 28, 2012

(30) Foreign Application Priority Data

Jun. 30, 2009 (NZ) ........................ 578107

(51) Int. Cl.
G01C 23/00 (2006.01)
F42B 15/01 (2006.01)

(52) U.S. Cl.
USPC ............................ 701/3; 244/3.15

(58) Field of Classification Search
USPC ........... 701/3, 4, 5, 6, 7, 8, 11, 12, 14, 15, 16, 701/17, 18, 468, 528, 529, 539; 244/3.19, 244/3.15, 17.17, 185, 186, 220, 90 R; 340/959, 967, 972, 979, 951; 342/18, 342/34, 35, 49, 58, 63, 83, 81, 84, 87, 157, 342/199, 357.53, 38, 176, 357.2, 357.33, 342/357.36, 462; 703/9, 11, 12
See application file for complete search history.

(56) References Cited

U.S. PATENT DOCUMENTS

| | | |
|---|---|---|
| RE35,920 E | 10/1998 | Sorden et al. |
| 6,092,008 A | 7/2000 | Bateman |
| 6,628,995 B1 | 9/2003 | Korson et al. |
| 6,765,499 B2 | 7/2004 | Flick |
| 6,799,094 B1 | 9/2004 | Vaida et al. |
| 7,102,564 B2 | 9/2006 | Huston et al. |
| 2003/0033927 A1* | 2/2003 | Bryant et al. ............ 91/471 |
| 2008/0094255 A1 | 4/2008 | Bethel |
| 2008/0174485 A1* | 7/2008 | Carani et al. ............ 342/357.07 |
| 2009/0061897 A1 | 3/2009 | Hamilton et al. |
| 2009/0146808 A1 | 6/2009 | Hovden |
| 2010/0253566 A1* | 10/2010 | Ino ............................ 342/32 |

FOREIGN PATENT DOCUMENTS

WO WO-2004008415 * 1/2004

* cited by examiner

Primary Examiner — Muhammad Shafi
(74) Attorney, Agent, or Firm — Dann, Dorfman, Herrelland Skillman, P.C.

(57) ABSTRACT

An aircraft monitoring system comprising a computer system and a receiver for receiving tracking data from a tracking device associated with an aircraft, the monitoring system having a passive tracking mode in which the computer system is configured to receive tracking data and an active tracking mode in which the computer system is configured to determine a condition indicative of an aircraft incident based on the absence of received tracking data. The monitoring system is automatically triggered into the active tracking mode when a signal is received from the aircraft indicating the aircraft has taken-off.

15 Claims, 6 Drawing Sheets

TRACKING SYSTEM DEVICE AND METHOD

FIELD OF THE INVENTION

The present invention relates to tracking systems comprising tracking devices and their monitoring systems, and in particular, although not solely, to tracking systems using GPS tracking devices and monitoring systems.

BACKGROUND TO THE INVENTION

Tracking devices are commonly used to track the position of vehicles, aircraft, vessels and the like. Typically, a tracking device comprises a GPS receiver that receives signals from a GPS satellite network. From the signals, the tracking device can calculate its location, and therefore the current location of the vehicle, vessel or aircraft in which it is installed. The device can have an output that indicates to a user the current position of the device and also historical position information.

The device may also transmit position information via a mobile telephone network or satellite based network to a monitoring system. The monitoring system itself can receive position information from a range of tracking devices installed on vehicles, vessels and/or aircraft. The monitoring system can log the information to enable monitoring of the position of one or more vehicles, vessels and aircraft at a central location. The information can be accessed via user directly at the monitoring location, or perhaps via a website.

It is an object of the present invention to provide apparatus, system or a method that allows for monitoring of an aircraft.

In a first aspect the invention may broadly be said to consist of an aircraft monitoring system comprising a computer system and a receiver for receiving tracking data from a tracking device associated with an aircraft, the monitoring system having an active tracking mode in which the computer system is configured to determine a condition indicative of an aircraft incident based on the absence of received tracking data, wherein the monitoring system is automatically triggered into the active tracking mode when a signal is received from the aircraft indicating the aircraft has taken-off.

In one embodiment of the first aspect the signal is received from the aircraft after an apparatus on the aircraft determines take-off from any one or more of a change in aircraft speed, a change in aircraft altitude, or a change in distance traveled by the aircraft.

Preferably the apparatus is the tracking device and determines take-off from any one or more of a change in aircraft speed, a change in aircraft altitude or a change in distance traveled by the aircraft.

Alternatively the apparatus obtains data from sensors on the aircraft indicative of or from which can be determined any one or more of a change in aircraft speed, a change in aircraft altitude, or a change in distance traveled by the aircraft or other parameter indicating aircraft take-off.

In a second embodiment of the first aspect the signal contains data indicative of or from which can be determined any one or more of a change in aircraft speed, a change in aircraft altitude, or a change in distance traveled by the aircraft indicating aircraft take-off.

In a third embodiment of the first aspect the signal is received from the aircraft after an undercarriage position sensor triggers to indicate aircraft take-off.

Preferably in any one of the embodiments of the first aspect the condition indicative of an incident is determined based on the received tracking data.

Preferably the condition indicative of an incident is based on the absence of tracking data received from the tracking device in accordance with a transmission regime.

Preferably the tracking data comprises at least position information of the tracking device.

Preferably the aircraft monitoring system further comprises a tracking device in the aircraft, wherein the tracking device comprises:
 a positioning system for determining position information of the tracking device and/or the aircraft, and
 a transmitter for transmitting the position information to the monitoring system.

Preferably the position system is a Global Positioning System (GPS) comprising a GPS receiver and antenna for receiving position information from a GPS satellite.

Preferably upon determining a condition indicative of an incident in the active tracking mode, the monitoring system is adapted to provide an alert.

In a second aspect the invention may broadly be said to consist of a tracking device for installation in an aircraft and for use with an aircraft monitoring system, the apparatus comprising:
 a receiver for receiving GPS signals,
 a processor for generating tracking data from the GPS signals and/or other input information, and
 a transmitter for transmitting to an aircraft monitoring system the tracking data and/or a signal indicating take-off to trigger the aircraft monitoring system into an active tracking mode in which the monitoring system is configured to determine a condition indicative of an aircraft incident based on the absence of received tracking data.

Preferably the processor determines take-off from any one or more of a change in aircraft speed, a change in aircraft altitude, and a change in distance traveled by the aircraft from the tracking data and generates the signal in response.

Preferably the processor receives data from one or more sensors and determines take-off from any one or more of a change in aircraft speed, a change in aircraft altitude, or a change in distance traveled by the aircraft from the sensor data and generates the signal in response.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Preferred embodiments of the invention will be described with reference to the following drawings, of which.

DETAILED DESCRIPTION OF THE PREFERRED EMBODIMENTS

Figure 1:
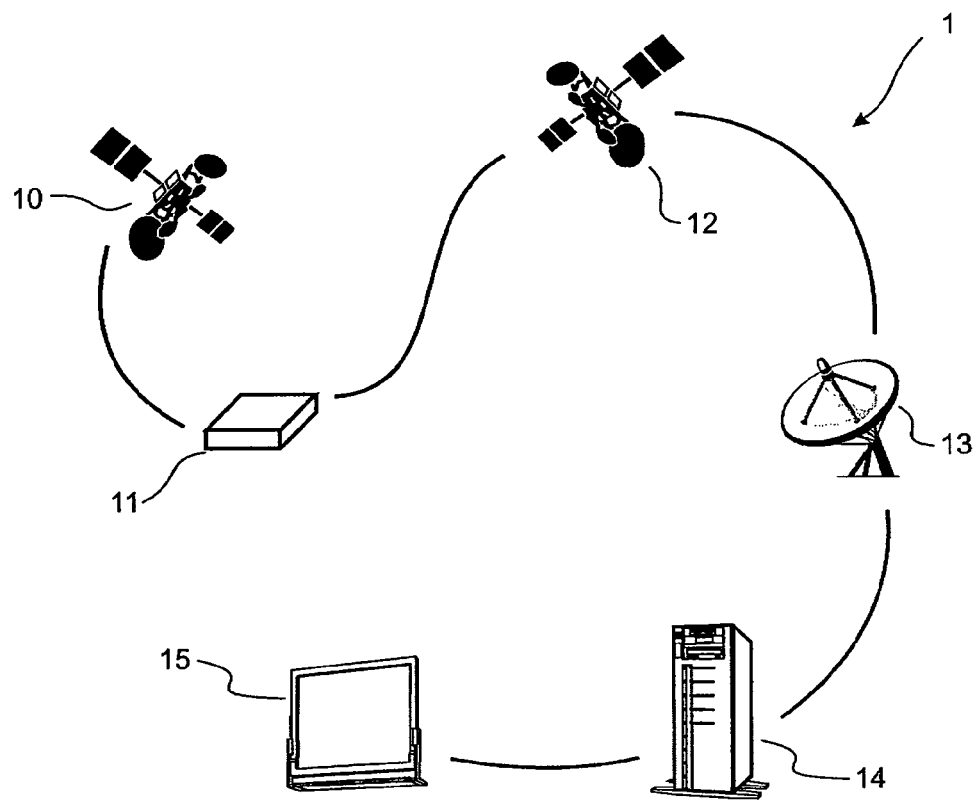
FIG. 1 is a schematic diagram of a tracking system in accordance with one embodiment of the invention.

FIG. 1 shows a tracking system 1 in accordance with one embodiment of the invention. The system 1 can operate in active tracking mode and passive tracking mode.

The tracking system comprises a tracking device 11 that can determine its position (location). The tracking device 11 is installed in a vehicle, vessel or aircraft or other object, and thus can track the position of the vehicle, vessel, aircraft or other object in which it is installed. The tracking device 11 receives signals from location stations e.g. 10, and from those signals can determine its position. In a preferred embodiment, the tracking device 11 is a GPS tracking device that receives signals from the GPS navigation satellite system 10. From the GPS signals, the tracking device 10 can calculate or otherwise determine its position, in the manner known to those skilled in the art. It will be appreciated however it is not essential for the tracking device to use GPS technology, and other tracking technology could be used.

The tracking device 11 is adapted to, as and when required, transmit data indicating its location or position to a monitoring system 14/15. It may do this when certain conditions are met. Such conditions might comprise distance from last positions report and/or other changes in distance, changes in time, cumulative distance traveled since last position report, changes in altitude, changes in velocity (either direction or speed), impact detection, requests for position report by an external source (e.g. button on device, request from web server).

The tracking device 11 is also configured to send a trigger signal to a monitoring system to change the status or mode of the monitoring system from passive tracking mode to an active tracking mode. The trigger signal is sent upon a trigger condition being met, or embodies data indicating the trigger condition. The trigger condition is met when the aircraft in which the tracking device is installed takes-off. This could be determined by at least any one of a change in aircraft speed, a change in aircraft altitude and/or a change in distance traveled by the aircraft. These changes can be determined by the tracking device using the GPS signals, or by any other means including physical switches such as undercarriage sensors The monitoring system comprises a computer system 14 that receives the position data and utilises software to log and process the position data. The computer system 14 can present tracking information to a user via an output 15. Typically, monitoring system 14/15 provides output to the user over a website or other network, but any type of monitoring system used in any type of network could be employed. The monitoring system 14/15 is arranged to receive the trigger signal from a transmitter associated with the tracking device 11 to activate and/or change the status or mode of operation of the monitoring system from passive tracking mode to active tracking mode. It will be appreciated that in a possible embodiment, the monitoring system could receive data from which take-off of the aircraft can be determined by the monitoring system. In this case, that data forms the trigger signal. For example, the monitoring system might receive tracking data relating to speed, altitude and/or distance (or change therein) and from this determine when the take-off has occurred. From this, the monitoring system could upon receiving and processing the data be triggered by that data to change from a passive to active tracking mode.

Preferably, the tracking device 11 transmits data indicating its position to the monitoring system 14/15 via a satellite communications network 12. This could be, for example the existing IRIDIUM satellite network. This comprises a satellite network 12 to which data can be transmitted and a base station 13 that receives a relayed version of the data transmitted to the satellite network 12. The base station 13 then communicates the information to the monitoring site via standard terrestrial or other communication means. While the tracking system 1 preferably utilises satellite communications to transmit position data from the tracking device 11 to the monitoring system 14/15, this is not essential. Any sort of communications channel could be used, another example being a mobile telephone network.

The tracking system 1 in its simplest form comprises the monitoring system 14/15 and at least one tracking device 11 installed in a vehicle, vessel aircraft or other object. However, the tracking system could also be considered to also comprise the GPS satellite network and/or communications channel. These, however, are typically operated by third parties and are not considered part of the tracking system per se. It will also be appreciated that the tracking system 1 could comprise more than one tracking device 11, each device being installed in a different vehicle, vessel or aircraft. This enables the monitoring system to monitor a range of tracking devices 11 and more particularly the vehicles, vessels or aircraft in which they are installed. It should be noted that because in use a tracking device is installed in a vehicle, vessel, aircraft or other object, reference to the device's position will also imply a reference to the position of the vehicle, vessel, aircraft or other object in which it is installed.

Figure 2:
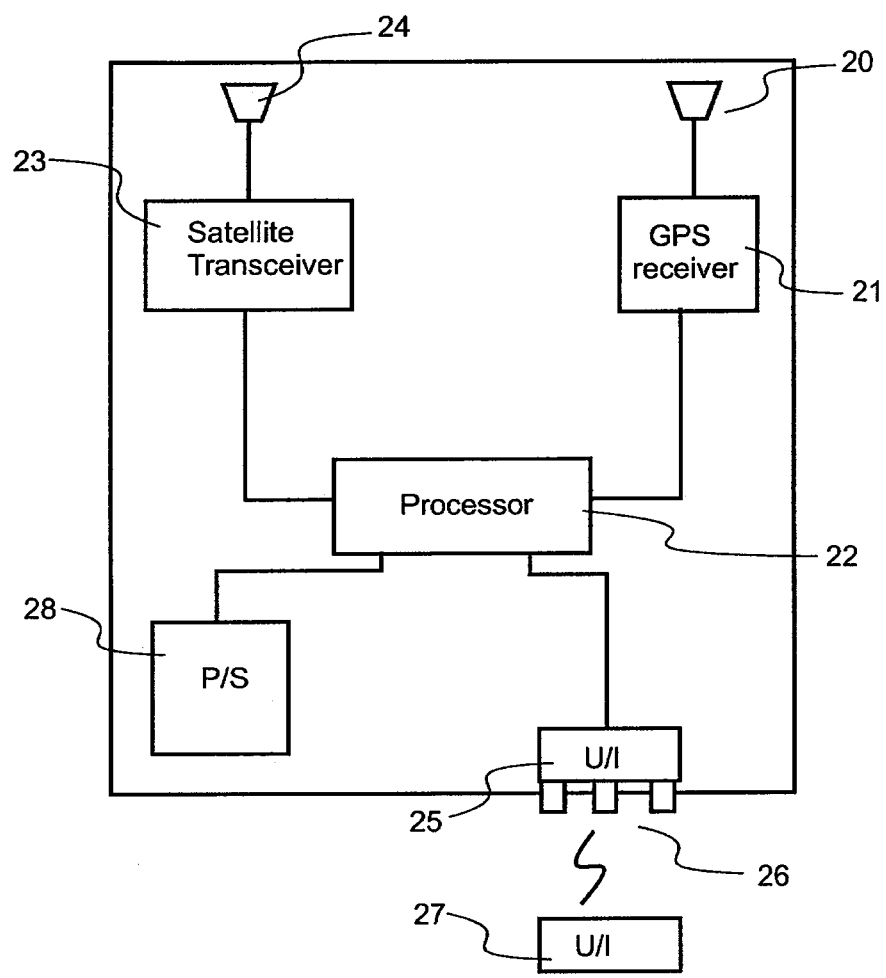
FIG. 2 is a block diagram of the tracking device.

FIG. 2 shows a block diagram of the tracking device 11 in further detail. The tracking device preferably comprises a GPS antenna 20 connected to a GPS receiver 21. The GPS receiver 21 feeds the received data into a processor 22, which can determine the device's position from the received signals. The processor 22 is connected to a satellite transceiver 23 and antenna 24 that enables the processor 22 to transmit data indicating the device's position via the satellite network 12 to a monitoring system 14/15. The processor can also determine aircraft speed (such as ground speed), distance from a point and/or altitude from position and/or altitude information received from the GPS receiver 21. Thus, the processor can form an aircraft speed, altitude and distance determining device. Other means, such as sensors, could be used instead for determining aircraft speed, distance and/or altitude. Barometers and/or other suitable sensors may also be employed to determine the aircraft's altitude. Various types of sensors can therefore connect to the processor 22 to enable determination of information, such as change in distance, speed or altitude, indicative of an event or incident such as take-off.

The processor 22 is connected to a user interface 25, which comprises buttons 26 or other input means that enables a user to operate the device 11. The user interface 25 might also comprise an output screen and/or other output means such as LEDs or audio signals to indicate various operational states of the device and to output information. Further, there might be a remote user interface 27, such as a keyboard or, control panel or the like wirelessly connected to the device or wired to the device 11. The device also comprises a power source 28 that might be internal (such as a battery) or connectable to an external power source such as a cigarette lighter of a vehicle.

The device 11 can determine its position at any particular instant based on the incoming signals received from the GPS satellite network 12. The device might continuously receive GPS signals and use the processor 22 to determine the device's position. Alternatively, it might continuously receive signals, but only periodically determine its position. Alternatively, the device 11 might only periodically receive signals and periodically determine its position. After determining the device's position, the processor might continuously or periodically transmit its determined location to the monitoring system 14/15. It might do this in real-time, i.e. as it determines the current position. This means the position data that is transmitted indicates the current position of the device. Alternatively, the processor 22 might store the determined position at each instant for transmission at a later date. This means that the position data transmitted might not relate to the current device position. In general the device 11 is capable of receiving signals at various time instants, and from those, determining the device's position at those time instants. The device can then transmit data indicating the determined position at those time instants in accordance with a suitable regime, based on its mode of operation.

Typically, when the device 11 transmits data at a particular instant, this data will indicate and relate to a single position that was determined at a time instant just prior to transmission (or some time before). However, data could be batch transmitted, indicating a number of positions of the device at various time instants determined prior to transmissions.

Figure 3:
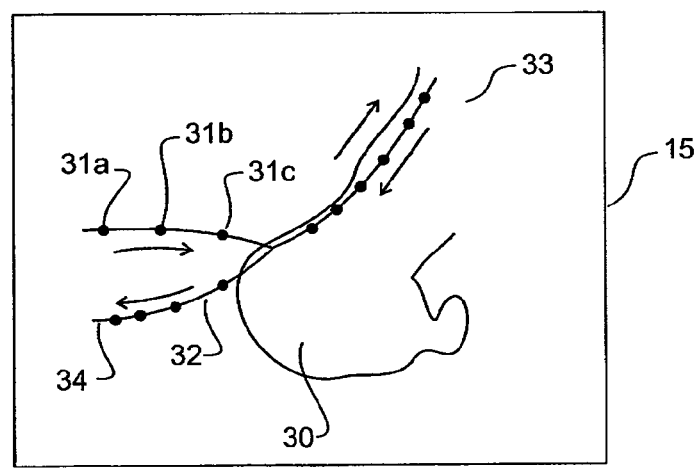
FIG. 3 is a schematic diagram showing a monitoring system output displaying an aircraft's journey path using the system in a normal mode.

The tracking system enables tracking or monitoring of vehicles, vessels, aircrafts or other objects in which tracking devices 11 are installed. The remainder of the description will refer to the tracking device being installed in an aircraft, however this should not be considered a limiting application of the invention. FIG. 3 shows in schematic form an example of the output screen 15 of the monitoring system 14/15 when the tracking device 11 is operating. The screen shows the general path 33 of an aircraft being monitored, which has a tracking device 11 installed within it. The tracking device periodically determines its position and periodically transmits data indicating its position at a number of time instants. The periodic transmission of data will preferably relate to its current determined position, although this is not essential. At each time instant when the device 11 determines its position, data indicating that position is transmitted. This position data is received by the monitoring system 14/15, which then stores and processes the data and also uses the data to generate a display 15 of the path 33 of travel of the aircraft. In particular, the monitoring system display a series of dots e.g. 31a, 31b, 31c superimposed on a map 30 of the area in which the device 11 is located, each dot relating to a position of the device at that time. Preferably, dots are added to the display as further position data is received, indicating updated positions of the device in real-time. It will be appreciated that there might be some inherent delay in the system, so the use of the term "real-time" should be taken in its technological context, and not be considered in a limiting manner. A tracking line 32 interpolating the movement of the device between those dots is also superimposed on the map.

As can be seen in FIG. 3, the aircraft being tracked has approached land 30 from the west and then has traveled up in a north-east direction up to the top 33 of the region indicated by the map. The aircraft, then returns generally along the same path in a south-west direction and then leaves the land 30 as indicated by path 34. Each dot represents the location of the device at a particular time in accordance with data that is transmitted.

The data is transmitted from the tracking device periodically, so not every position of the device/aircraft is necessarily transmitted. Rather, it may be transmitted every minute or other period of time. Preferably, the data indicating the position is transmitted substantially in real-time. However, in an alternative the device may delay transmission if necessary. This means that the display in the monitoring system may not be updated in real-time. In this case, the time at which a particular position was determined could be transmitted along with the location data, so this could be determined from looking at the monitor output.

Figure 4:
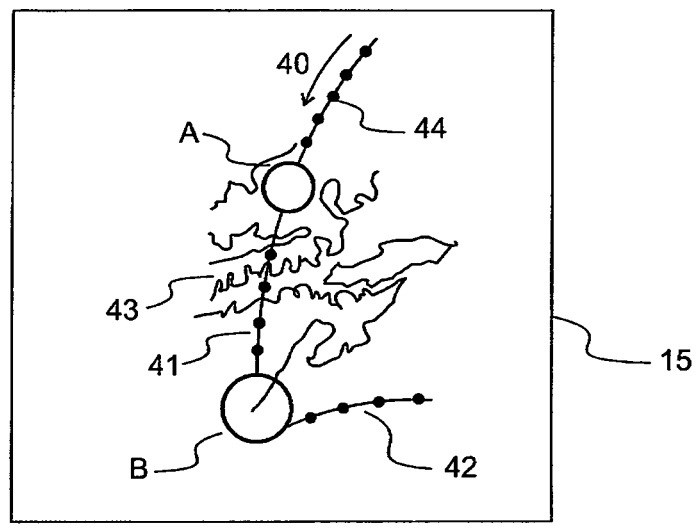
FIG. 4 is a schematic diagram showing a monitoring system output displaying an aircraft's journey path using the system in a pause mode.

The device allows for temporary suspension of transmission from the tracking device 11 of data indicating the tracking device's determined position. FIG. 4 shows in schematic form an example of the output 15 of the monitoring system 14/15 when the device 11 is temporarily ceasing transmission. The output 15 of the monitoring system provides an indication of how the mode functions. Suspension of data transmission can be triggered manually by a user by pressing one of the user interface buttons 26. Alternatively, and more preferably, the suspension of data transmission is activated when the device/aircraft 11 reaches a particularly geographical area e.g. A or B. This allows the device/aircraft 11 to be tracked while in route to a particular area, or while it is at high risk of accident. When the device reaches a particular area where tracking is not required, data transmissions are suspended. This will be an area where it is not critical to track the device/aircraft. This could be, for example because the device/aircraft 11 is in a known area and it is not critical that the monitoring system knows exactly where the device is within that area. Knowledge of the device being in the region is enough in itself.

Suspending data transmissions is used in order to reduce the amount of data transmitted, the power used by the device and/or the cost in transmitting the data. The geographical area in which the tracking device suspends data transmission could be predetermined, or determined dynamically. It could be defined as a geo-fenced area, and/or a particular radius from a trigger point. This definition could be stored in the monitoring system and/or the tracking device itself.

When the device 11 is operating, it determines the device's location and transmits this periodically in the usual manner as described in relation to FIG. 3. The monitoring system 14/15 receives this data, logs it and generates a display on the output in accordance with the data in the usual manner. This comprises displaying dots for every position location received, e.g. 44, and showing a tracking path 40-42 overlayed a map 43. However, when suspension of data transmission is instigated (either manually, or by the location device reaching a particular geographical area or location) the tracking device suspends transmission of data indicating its position. For example, as seen in FIG. 4, an aircraft with the tracking device flies generally in a south-west direction 40 until it reaches region A. While the aircraft is within region A, irrespective of how long the aircraft is in that area, or where it goes within that region, the tracking device 11 stops transmitting data indicating its determined position to the monitoring system. This provides a "blank spot" A in the display of the monitoring system. When the tracking device eventually leaves the geographical region A, or the device is manually operated to retransmit, the device will recommence transmission of data indicating its determined position. Similar, the device 11 transmits while it is en route 41 to region B. When the device 11 determines that it/the aircraft has reached region B, transmissions stop. They recommence once the device/aircraft 11 leave the region B on path 42.

There are a number of instances where this could be useful. For instance, a crop duster may fly to various farms during a day in order to dust the crops on those farms. While the crop duster aircraft is en route e.g. 40 to a particular farm e.g. in region A, active tracking is desirable. This enables the monitoring system to know the position of the device/aircraft 11 and therefore detect if an emergency or other anomaly occurs. However, when the crop duster arrives at a particular farm e.g. A and operates in that farm for several hours, there is no requirement to necessarily transmit data. The aircraft is in a known area, and the particular position in that area is not critical. At this point the pause mode can be operated manually, or it could be triggered by the device entering that defined area.

When the crop duster completes its work in that particular farm A, it will fly 41 to the next farm B. During this journey, it is important that the aircraft is actively tracked to detect emergencies or anomalies. Therefore, as the aircraft leaves the first farm A or when the pause mode is manually deactivated, the device will recommence transmissions to the monitoring system. This allows monitoring of the aircraft as it travels 41 from the first farm A to the second farm B. Once the aircraft reaches the second farm B, the data transmissions again will be suspended while it is within the particular region B.

Another use might be when a student pilot is flying practice circuits in the vicinity of an aerodrome. While the student pilot is flying circuits in the known area, there is no need to report its location as the pilot is in visual contact with the aerodrome and others on the ground. However, once the practice circuits have been completed and the pilot commences his journey home, the active tracking function will be activated. This will happen either automatically by leaving the defined area or manually by the pilot.

Figure 6:
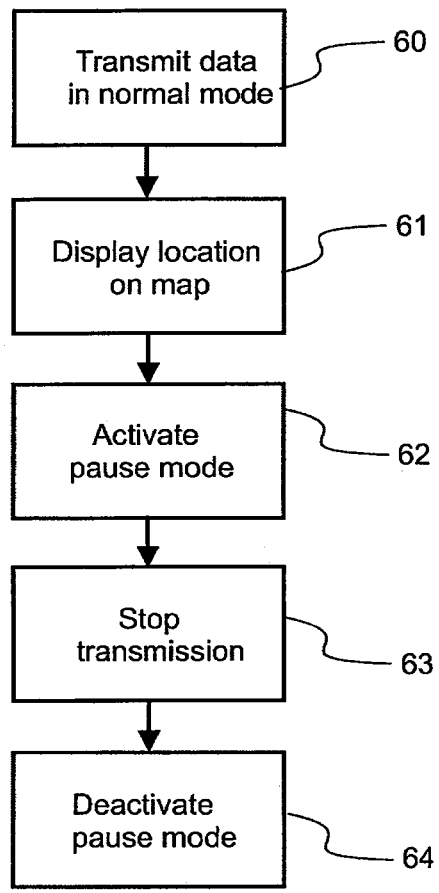
FIG. 6 is a flow diagram of the tracking system's operation during a pause method.

FIG. 6 shows an overview of the method. The device 11 transmits data in initially, step 60. The monitoring system 14/15 detects this and displays the information on an output, step 61. Data transmission suspension is then activated, step 62. This is either done manually, and/or by entering a defined region. Data transmissions then stop, step 63. Data transmission suspension is then deactivated, either manually or by leaving the region, step 64. Transmission then continues in normal mode, step 60.

Active and Passive Tracking Modes of Monitoring System

Figure 5:
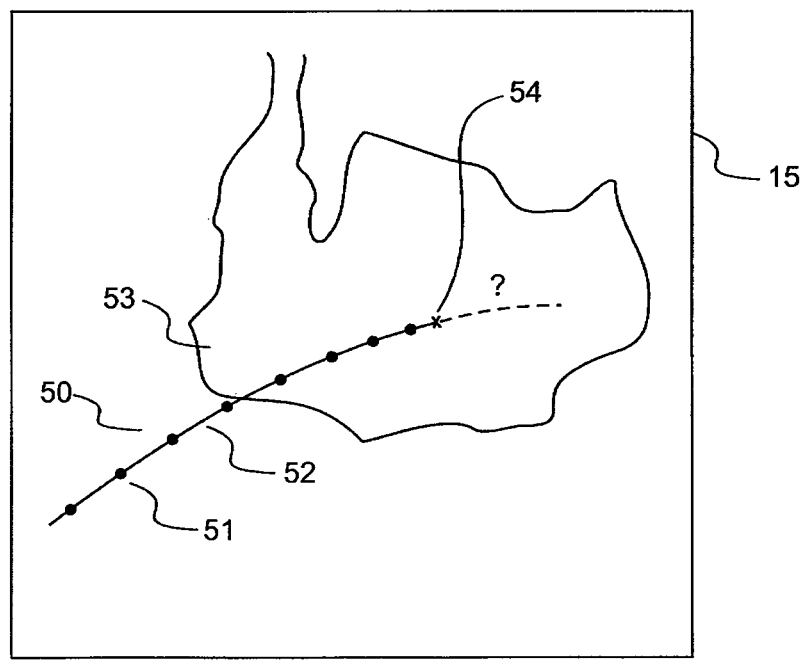
FIG. 5 is a schematic diagram showing a monitoring system output displaying an aircraft's journey path using the system in a monitoring mode.

The active tracking mode of the tracking system enables the monitoring system to determine whether an anomaly has occurred with the plane, such as an emergency. The monitoring system 14/15 can then provide an alert if this occurs. FIG. 5 shows in schematic form an example of the output of the monitoring device when the active tracking mode is in operation. This provides an indication of the function of the active tracking mode. During the active tracking mode, the tracking device 11 determines its position and transmits data indicating its position in the usual manner, such as described in relation to FIG. 3. In the active tracking mode, the data indicating position will be transmitted in relation to a particular regime or pattern. For example, it may be that the data indicating determined position is transmitted periodically, for example every minute. Another transmission regime might be used instead. The monitoring system 14/15 stores data specifying the regime, and therefore expects to receive position data from the tracking device 11 in accordance with the regime. For example, if the regime is periodic transmission of data every one minute, then the monitoring system 14/15 expects to receive transmitted position data from the tracking device 11 every one minute. The monitoring system 14/15 receives this data, logs it and generates a display on the output in accordance with the data in the usual manner. This comprises displaying dots for every position location received, e.g. 51, and showing a tracking path 52 overlayed a map 53.

During active tracking, f the monitoring system detects an anomaly in the received data (e.g. loss of data 54), it carriers out an action in response. In the passive tracking mode, the absence of data 54 at preset times will not cause anything to happen.

For example, if the regime is to transmit data every one minute, and more than one minute elapses 54 since the last received transmission, the monitoring system will detect that an anomaly has occurred, and infer that a crash or other emergency has occurred with the vehicle, vessel, or aircraft in which the device is installed. This might be due to the transmissions from that device ceasing. When operating in the active tracking mode, the monitoring system 14/15 then sends out an alert, in the form of a text message, email, pre-recorded phone message, pager message or some other communication to an interested party. For example that interested party might be a next-of-kin of the aircraft operator, or emergency services. In addition to detecting an emergency has occurred by the absence of transmission, the monitoring system can also derive the last known location of the aircraft. This information can also be provided to interested parties as required, to assist the search and rescue mission. The monitoring system may optionally allow a short period to elapse before sending an alert, to prevent false alerts caused by a momentary loss of data.

The active tracking mode is activated when the monitoring system receives a trigger signal from the aircraft. This trigger signal is preferably sent when the aircraft takes-off. This ensures that the monitoring system goes into active tracking mode automatically upon aircraft taking-off, rather than awaiting or relying on the pilot to manually trigger active tracking. The trigger signal is sent from a transmitter on the aircraft. The triggers signal is sent upon any suitable detection of a parameter indicating aircraft take-off. As discussed above, this can be detected when there is a change in speed, altitude and/or distance of the aircraft as determined by the GPS device, or other sensors in the plane. It could also be trigger on other events, such as the landing gear being retracted. Alternatively, as noted above, the trigger signal can embody information from which take-off can be determined (for example by the monitoring system)

Figure 7:
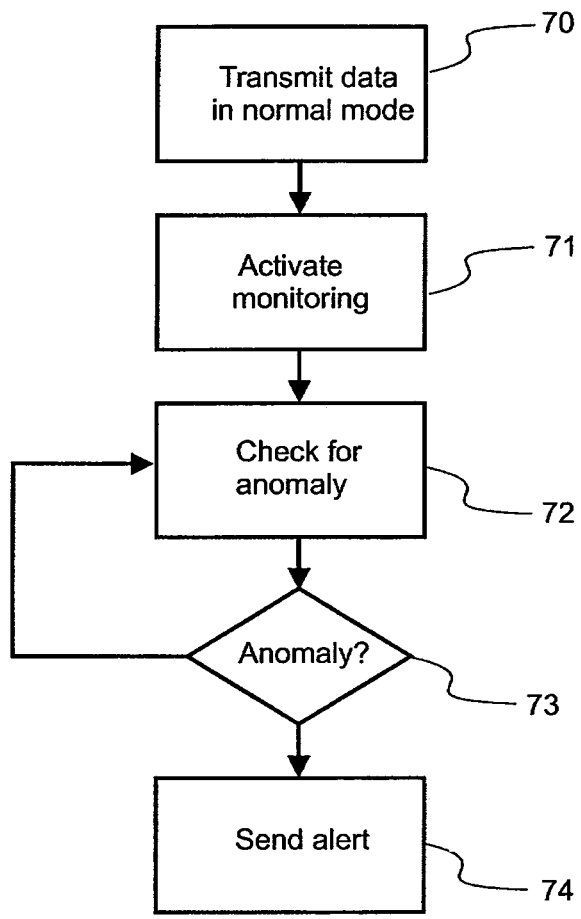
FIG. 7 is a flow diagram of the tracking system's operation during a monitoring method.

The active tracking mode method is shown in FIG. 7. The device 11 transmits in passive tracking mode initially, step 70. In passive tracking mode, the data from the GPS device of the aircraft is received and displayed by the monitoring system, but no action or active monitoring of it takes place. Then, active tracking mode is activated, step 71. The monitoring system 14/15 then checks for anomalies, i.e. that the received data is received in accordance with the known regime, step 72. If there is an anomaly and the system 14/15 is m the active tracking mode, step 73, then an alert is sent, step 74. Otherwise, the monitoring system 14/15 keeps checking for anomalies.

In the preferred embodiment, upon detecting an anomaly (incident) in active tracking mode, the monitoring system 14/15 alerts various categories (groups) of contacts (arranged in tiers or hierarchies).

Figure 8:
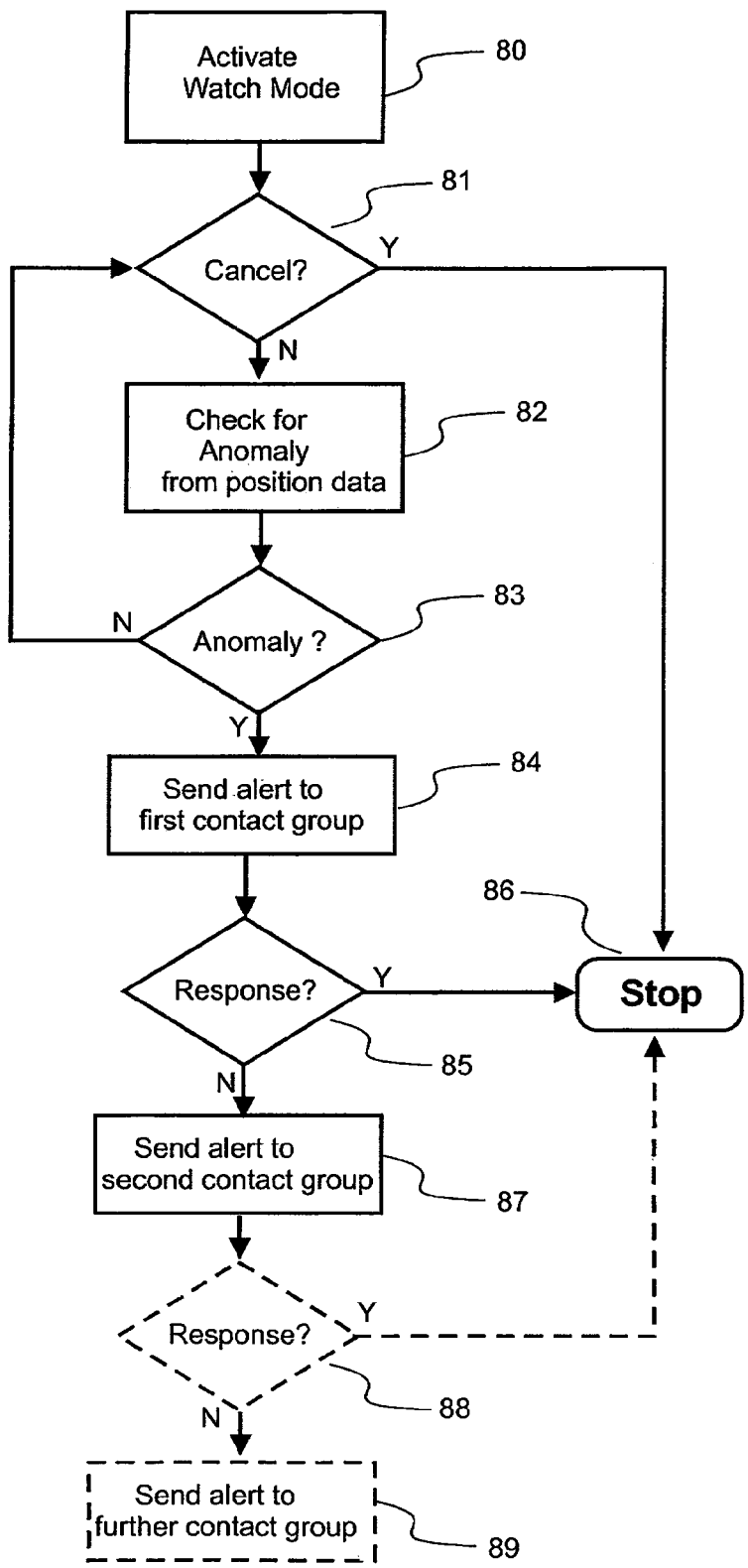
FIG. 8 is a flow diagram of the tracking system's operation during a watch mode.

In the preferred form, the active tracking mode is implemented as follows, with reference to FIGS. 2 and 8. The tracking device determines change in speed (such as ground speed) of the aircraft via the speed determining means (such as the processor in combination with the GPS), change in distance traveled by the aircraft (using processor in combination with the GPS), and/or the change altitude of the aircraft. These changes can indicate take-off. When there is a change in any one of aircraft speed, distance traveled and altitude a trigger condition is met and the active tracking mode of the monitoring system 14/15 is triggered, step 80. This triggers the monitoring system 14/15 to function in a particular manner (and optionally also the tracking device 11, although it's operation may remain substantially the same). The watch mode can be cancelled by the pilot through a cancel button 26 in the user interface 27, step 81, but may be only when the groundspeed drops below a threshold (e.g. 40 knots for groundspeed). If it is still above the threshold, the tracking device and monitoring system remain in watch mode, step 80.

When the active tracking mode is triggered, step 80, the monitoring system 14/15 continues to monitor for an anomaly (incident) as described above, steps 82, 83. That is, it expects to receive position updates from the tracking device 11 in accordance with a regime. If something appears to have gone wrong, the anomaly will be detected and the monitoring system 14/15 will alert the required people. However, it will do so in the following manner.

The monitoring system 14/15 has contact groups arranged in tiers or hierarchies. Each contact group contains one or more members who can be contacted in the event of an incident. Contact details for each member are stored for alerting the member by a suitable communication means, such as SMS message, telephone call, fax, email or the like. For example, the first contact group might comprise personnel of the pilot's organisation and support network (family members and the like), and the second contact group might comprise personnel of public rescue authorities such as Search and Rescue. Further contact groups might also exist, with different personnel.

When an incident occurs, step 83, members of the first contact group are alerted first in a suitable manner (e.g. by SMS message or telephone call etc.), step 84. The alert can provide useful information for search and rescue, such as last location of the aircraft, and e.g. a hyperlink to the monitoring system website. If none of the members of the first contact group respond within a threshold time (e.g. 20 mins), step 85, then members of the second contact group are alerted next, in a suitable manner, step 87. If the second group is a public rescue service, it will be assumed they will respond.

However, yet further contact groups might exist (such as third and subsequent contact groups), as back up in case members of the second group do not respond. In the situation where yet further contact groups exist in the system, further alerts can be made, step 89, to members of the third and subsequent groups, if no response is made, step 88, by the members of the previous contact groups. Each group forms part of a hierarchy, whereby members of a later group in the hierarchy are only contacted if no members respond from previous contact groups, steps 84 to 89.

Whether or not a member has responded can be determined by a suitable method. For example, a member might respond by contacting the monitoring system 14/15 via SMS message, email, telephone call or the like. If a response is made, steps 85 or 88, then the no further alerts are sent, step 86.

The monitoring system 14/15 is triggered into the active tracking mode, step 80, by the tracking device. When the tracking device receives input indicating a trigger condition such as a change in speed, altitude or distance traveled or any combination thereof, it will send a trigger signal to the monitoring system 14/15 that it should now change the mode of operation from passive tracking to active tracking. The monitoring system in this case might already be receiving and/or monitoring position data coming from the tracking device. Alternatively, the monitoring system might be triggered into the active tracking mode by the tracking device commencing the transmission of position data to the monitoring system— that is, once it starts receiving the data, the monitoring system 14/15 operates as set out above. In this case, upon the tracking device being triggered by the trigger condition, it will trigger the monitoring system by sending position data.

Upon cancellation of the active tracking mode by the pilot (which may also require the groundspeed for example to drop below the threshold), the monitoring system 14/15 will be triggered out of the active tracking mode and into the passive tracking mode. This can be by a trigger signal.

The active tracking mode provides advantages. The pilot does not need to arrange a flight plan and emergency search and rescue time. Rather, the system automatically goes in to active tracking mode when the aircraft takes off for example as determined by a change in speed, distance traveled or altitude. When the aircraft speed drops below a threshold speed and the pilot presses a cancel button the active tracking mode can then stop. The active tracking mode triggers automatically when the aircraft takes off or moves—there is no need for the pilot to remember to trigger the mode. Also, even if groundspeed drops below the threshold, the active tracking continues until the pilot presses cancel. This means the active tracking mode continues even during low speed work (e.g. hovering helicopter).

Active tracking provides a much faster emergency response in the event of an incident. Emergency help can be alerted and despatched soon after the incident. In existing flight plan regimes, the pilot provides a Search and Rescue time—being a time by which Search and Research despatch emergency assistance if the pilot has completed the flight and checked in. If an aircraft is involved in an incident, emergency help will not be despatched until after the Search and Rescue time, which might be hours after the actual incident. Responding quickly is important to ensure help is provided in a timely manner. The hierarchical contact groups also enable third party organisations to remain undisturbed in the first instance. This reduces the number of times they are bothered with false alarms (e.g. where pilot forgets to cancel the watch mode) and small incidents that can be handled by other people. This reduces the drain on third party resources, as such incidents can be dealt with by the pilot's personal support group.

In the preferred embodiments, the data sent from the tracking device 11 to the monitoring system 14/15 comprises position data. It might also contain other data, cumulative distance traveled since last position report, altitude, changes in altitude, velocity, changes in velocity (either direction or speed), impact detection, requests for position report by an external source or the like. Any data typically sent by a tracking device could be sent in the present invention. The data could be determined by the onboard processor of the device from the raw data in the received signals from the GPS satellites. Alternatively, raw data could be sent to the monitoring system, wherein the above information is calculated and the monitoring system then changing its mode of operation from the calculations accordingly (changing from passive tracking to active tracking mode when a change in speed, distance or altitude is calculated for example).

In the case of active mode, the monitoring system could simply be a receiver that sends out alerts when contact is lost—a full monitoring/website service might not be necessary.

In an alternative, the tracking device might not send position data. Rather, it might send signals or other data. This would enable the monitoring system to monitor the transmissions, and determine if an anomaly in transmission had occurred, even if the tracking device position is not known.

The invention claimed is:

1. An aircraft monitoring system comprising a computer system and a receiver for receiving tracking data from a tracking device associated with an aircraft during passive and active tracking modes of operation of the monitoring system, in the active tracking mode the computer system is configured to determine an anomaly in the tracking data that is indicative of an aircraft incident and to generate an alert for transmission to a third party upon determining the anomaly, and wherein the monitoring system is automatically triggered into the active tracking mode from the passive tracking mode when a signal is received from the aircraft indicating the aircraft has taken-off.

2. An aircraft monitoring system according to claim 1 wherein the signal is received from the aircraft after an apparatus on the aircraft determines take-off from any one or more of a change in aircraft speed, a change in aircraft altitude, or a change in distance traveled by the aircraft.

3. An aircraft monitoring system according to claim 2 wherein the apparatus is the tracking device and determines take-off from any one or more of a change in aircraft speed, a change in aircraft altitude or a change in distance traveled by the aircraft.

4. An aircraft monitoring system according to claim 2 wherein the apparatus obtains data from sensors on the aircraft indicative of or from which can be determined any one or more of a change in aircraft speed, a change in aircraft altitude, or a change in distance traveled by the aircraft or other parameter indicating aircraft take-off.

5. An aircraft monitoring system according to claim 1 wherein the signal contains data indicative of or from which can be determined any one or more of a change in aircraft speed, a change in aircraft altitude, or a change in distance traveled by the aircraft indicating aircraft take-off.

6. An aircraft monitoring system according to claim 1, wherein the signal is received from the aircraft after an undercarriage position sensor triggers to indicate aircraft take-off.

7. An aircraft monitoring system according to claim 1 wherein the condition indicative of an incident is the absence of tracking data received from the tracking device in accordance with a transmission regime.

8. An aircraft monitoring system according to claim 1 wherein the tracking data comprises at least position information of the tracking device.

9. An aircraft monitoring system according to claim 1 further comprising a tracking device in the aircraft, wherein the tracking device comprises:
a positioning system for determining position information of the tracking device and/or the aircraft, and
a transmitter for transmitting the position information to the monitoring system.

10. An aircraft monitoring system as claimed in claim 9 wherein the position system is a Global Positioning System (GPS) comprising a GPS receiver and antenna for receiving position information from a GPS satellite.

11. An aircraft monitoring system according to claim 1 wherein upon determining a condition indicative of an incident in the active tracking mode, the monitoring system is adapted to provide an alert.

12. A method for monitoring an aircraft by an aircraft monitoring system the method comprising the steps of:
operating the monitoring system to receive tracking data from a tracking device associated with the aircraft during passive and active tracking modes of operation of the monitoring system, and
automatically triggering the monitoring system into the active tracking mode from the passive tracking mode, when a signal is received by the monitoring system from the aircraft indicating the aircraft has taken off, in the active tracking mode the monitoring system being configured to determine an anomaly in the tracking data that is indicative of an aircraft incident, and generating an alert for transmission to a third party upon determining the anomaly.

13. A method as claimed in claim 12 wherein the signal contains data indicative of or from which can be determined any one or more of a change in aircraft speed, a change in aircraft altitude, or a change in distance traveled by the aircraft indicating aircraft take-off.

14. A method according to claim 12 wherein the condition indicative of an incident is determined based on the absence of tracking data received from the tracking device in accordance with a transmission regime.

15. A method according to claim 12 wherein the step of receiving tracking data from the tracking device comprises receiving positional information of the aircraft.

* * * * *